A. PRATHER.
WHEEL.
APPLICATION FILED DEC. 2, 1918.
1,327,253.
Patented Jan. 6, 1920.
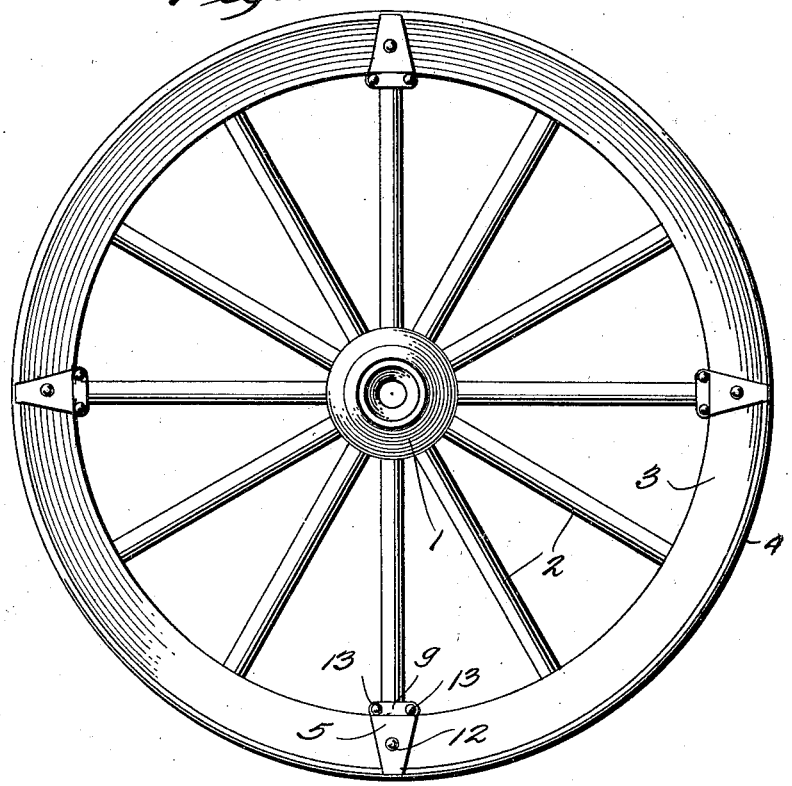
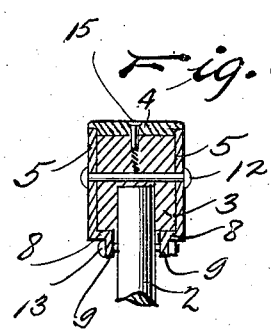
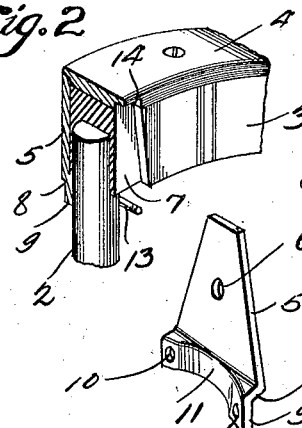
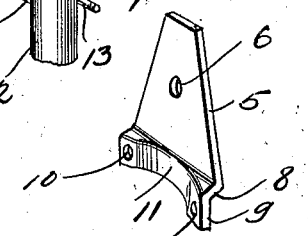
Inventor
Arthur Prather
By
Attorney

UNITED STATES PATENT OFFICE.

ARTHUR PRATHER, OF SKIDMORE, MISSOURI.

WHEEL.

1,327,253.  Specification of Letters Patent.  Patented Jan. 6, 1920.

Application filed December 2, 1918. Serial No. 265,009.

*To all whom it may concern:*

Be it known that I, ARTHUR PRATHER, a citizen of the United States, residing at Skidmore, in the county of Nodaway and State of Missouri, have invented certain new and useful Improvements in Wheels, of which the following is a specification.

My invention relates to new and useful improvements in a wheel and more particularly to means for securing the metal tire upon the felly.

The principal object of the invention is the provision of plates adapted to be secured to the sides of the felly and engage the metal tire to prevent the tire from slipping off the sides of the felly.

A further object is the construction of the plates in such a manner as to prevent circumferential movement of the tire upon the felly.

A still further object resides in the provision of means for connecting the plates around the wheel spokes to more securely hold them in position upon the felly.

With these and other objects in view my invention consists in the novel details of construction and arrangement of parts as will be more clearly understood from the following specification and drawings in which:—

Figure 1 is a side elevation illustrating the securing plates connected to a wheel.

Fig. 2 is a fragmental perspective showing one plate in position and the other plate removed.

Fig. 3 is a transverse vertical section through the wheel felly and plates secured thereto and, Fig. 4 is a detailed perspective of one of the securing plates.

In the drawings the numeral 1 indicates the hub of the wheel, 2 the spokes, 3 the felly, and 4 the metal tire received upon the outer surface of the felly. It will be understood that the parts so far described are of usual construction and form no part of the present invention.

For securely holding the tire upon the felly I provide a plurality of plates which are secured circumferentially of the felly, in spaced relation, and adapted to engage the side edges of the tire. These plates are illustrated more in detail in Fig. 4 of the drawings and comprise a straight vertical portion indicated at 5, provided with an opening 6, and this portion 5 of the plate is adapted to be received in a recess 7 formed in the side of the felly. A right angle extension 8 is formed on the lower edge of the portion 5, and is provided with a downwardly extending member 9 provided with openings 10. The downwardly extending member 9 is concaved as indicated at 11 and the purpose of which will be presently described.

These plates are adapted to be placed around the felly on each side thereof and bolts 12 passed through the plates, and through the felly 3, for securing the plates in position. The flange 8, on the bottom of the straight portion 5 of the plates extend below the under side of the felly and the flange 9, with the concaved portion 11, is adapted to pass around the spokes 2. Bolts 13 are adapted to pass through the openings 10 in the downwardly extending portions 9 for securing the plates around the spokes. Notches 14 are formed around the inner face of the tire 4, on each edge thereof, and are of such a size as to receive the upper ends of the portion 5 of the plates. As illustrated the notches are of sufficient depth so that the outer face of the plate will be flush with the sides of the felly. If desired to more securely connect the tire 4 to the felly 3 screws 15 might be used as illustrated more particularly in Figs. 2 and 3 of the drawings.

From the above detailed description it is thought that the advantages and mode of using my attachment will be clearly understood. In wheels as commonly constructed the tire very often slips off the side of the felly or creeps circumferentially around the felly. It is to overcome these objections that my attachment is intended and such attachment is of such construction so that it may be attached to new wheels or by merely forming notches in a tire and the sides of the felly may be used with old wheels. The plates will be connected to the felly as shown and by engaging the sides of the tire will prevent the tire from slipping off the sides of the felly or creeping circumferentially. By having the extensions 8 under the felly and the bolt 13 engaging on each side of the spokes 2 my plates will be more securely connected to the wheel.

The foregoing description and the drawings have reference to what may be considered the preferred, or approved, form of my invention. It is to be understood that I may make such changes in construction and arrangement and combination of parts, materials, dimensions, etc. as may prove expedient and fall within the scope of the appended claims.

Having fully described my invention what I claim as new and desire to secure by Letters Patent is:—

1. A wheel attachment comprising in combination with a tire having notches formed around its inner face, adjacent the edges, and terminating below the outer face, plates engaging the sides of the felly and having their upper ends received in the notches, and means for securing the plates to the felly.

2. In combination with a felly having circumferentially spaced recesses formed in the sides, a tire provided with circumferentially spaced notches in its inner face, said notches extending from the edges and terminating below the outer face of the tire, plates adapted to be received in the recesses and having their upper ends received in the notches, the outer faces of the plates lying flush with the outer faces of the felly and edges of the tire, and means for securing the plates to the felly.

In testimony whereof I affix my signature in presence of two witnesses.

ARTHUR PRATHER.

Witnesses:
 THOMAS PRATHER,
 CORA PRATHER.